US008936420B2

(12) United States Patent
Scroggie et al.

(10) Patent No.: US 8,936,420 B2
(45) Date of Patent: Jan. 20, 2015

(54) COLLAPSIBLE RETAINER

(75) Inventors: Derek Scroggie, Macomb, MI (US);
Robert Osterland, East China, MI (US);
Robert A. Murawski, Clinton
Township, MI (US); **Michelle E.
Bozinovski**, Macomb, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/997,678

(22) PCT Filed: Dec. 29, 2011

(86) PCT No.: PCT/US2011/067813
§ 371 (c)(1),
(2), (4) Date: Jun. 25, 2013

(87) PCT Pub. No.: WO2012/092473
PCT Pub. Date: Jul. 5, 2012

(65) Prior Publication Data
US 2013/0287518 A1    Oct. 31, 2013

Related U.S. Application Data

(60) Provisional application No. 61/429,017, filed on Dec. 31, 2010.

(51) Int. Cl.
*F16B 13/06*    (2006.01)
*F16B 5/06*    (2006.01)
*B23P 19/08*    (2006.01)

(52) U.S. Cl.
CPC ............... *F16B 5/0607* (2013.01); *F16B 5/065* (2013.01); *B23P 19/08* (2013.01)

USPC ................................................ 411/45; 411/78

(58) Field of Classification Search
USPC ................... 411/32, 45, 78, 80, 80.1, 80.2
See application file for complete search history.

(56) References Cited

U.S. PATENT DOCUMENTS

| 4,122,583 | A |   | 10/1978 | Grittner et al. |        |
|-----------|---|---|---------|-----------------|--------|
| 4,312,614 | A |   | 1/1982  | Palmer et al.   |        |
| 5,028,187 | A | * | 7/1991  | Sato            | 411/48 |
| 5,178,501 | A | * | 1/1993  | Carstairs       | 411/55 |
| 5,689,863 | A | * | 11/1997 | Sinozaki        | 24/297 |

(Continued)

FOREIGN PATENT DOCUMENTS

| EP | 1134432 A2  | 9/2001 |
|----|-------------|--------|
| ES | 2335254 A1  | 3/2010 |

(Continued)

OTHER PUBLICATIONS

International Search Report and Written Opinion corresponding to PCT/US2011/067813 dated Apr. 5, 2012.

*Primary Examiner* — Roberta Delisle

(57) ABSTRACT

A press-in fastener adapted to join a first component to a second component. The fastener includes a proximal head and a distal base clip portion below the head. The base clip portion includes an axially displaceable post structure and a pair of opposing wings extending in upwardly angled relation away from the travel path defined by the post structure. Collapsible legs engage the wings in operative connection to the post structure. As the fastener is pressed inwardly, upon encountering resistance from the second component, the legs collapse in folded relation as the post structure travels axially between the wings.

26 Claims, 10 Drawing Sheets

(56) References Cited

U.S. PATENT DOCUMENTS

| | | |
|---|---|---|
| 5,797,714 A | 8/1998 | Oddenino |
| 5,851,097 A | 12/1998 | Shereyk et al. |
| 6,511,273 B2 | 1/2003 | Arisaka |
| 6,715,185 B2 | 4/2004 | Angellotti |
| 7,017,239 B2 | 3/2006 | Kurily et al. |
| 7,152,281 B2 | 12/2006 | Scroggie |
| 7,243,401 B2 * | 7/2007 | Sawatani ........................ 24/297 |
| 7,351,023 B2 * | 4/2008 | Scroggie et al. .............. 411/508 |
| 7,698,787 B2 | 4/2010 | Scroggie et al. |
| 8,671,527 B2 * | 3/2014 | Scroggie et al. ................ 24/297 |
| 2003/0156917 A1 * | 8/2003 | Heflin et al. ..................... 411/45 |
| 2004/0181917 A1 * | 9/2004 | Sawatani ........................ 24/297 |
| 2007/0166127 A1 | 7/2007 | Scroggie et al. |

FOREIGN PATENT DOCUMENTS

| | | |
|---|---|---|
| JP | 52018564 A | 2/1977 |
| JP | 2002106519 A2 | 4/2002 |

\* cited by examiner

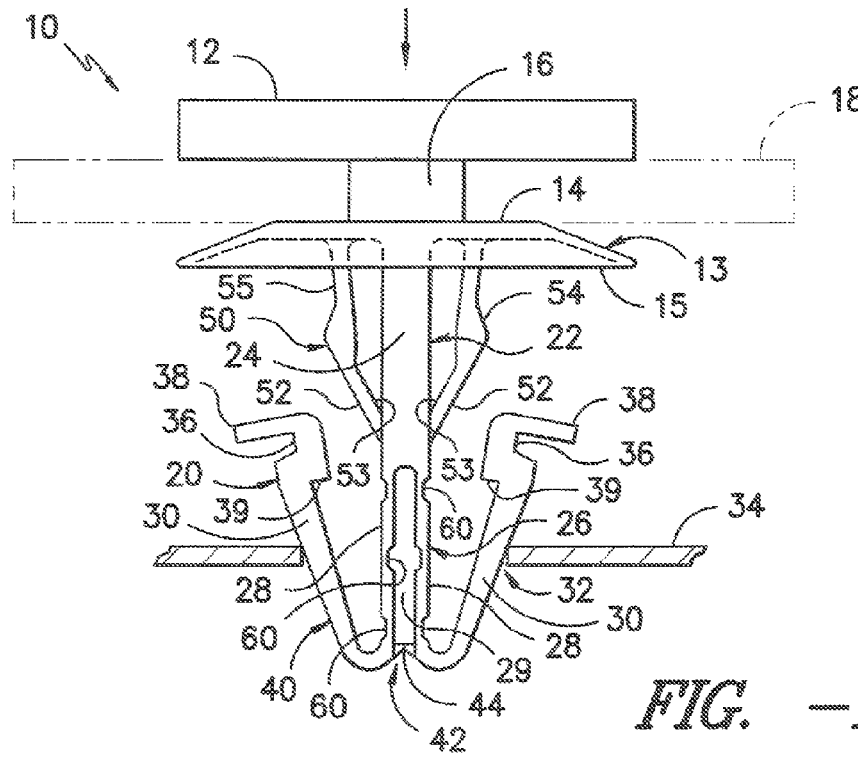
FIG. -1-
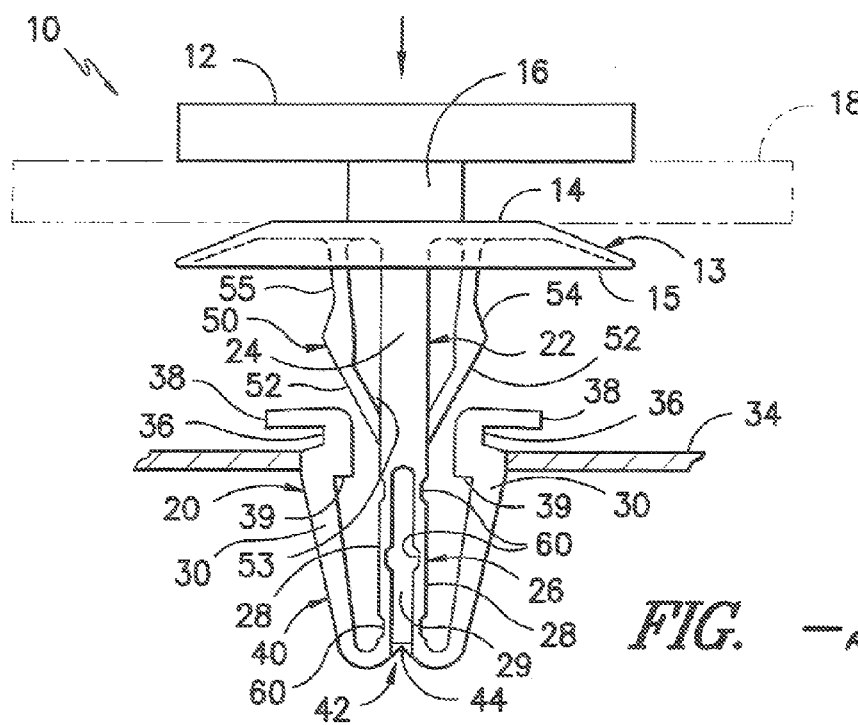
FIG. -2-

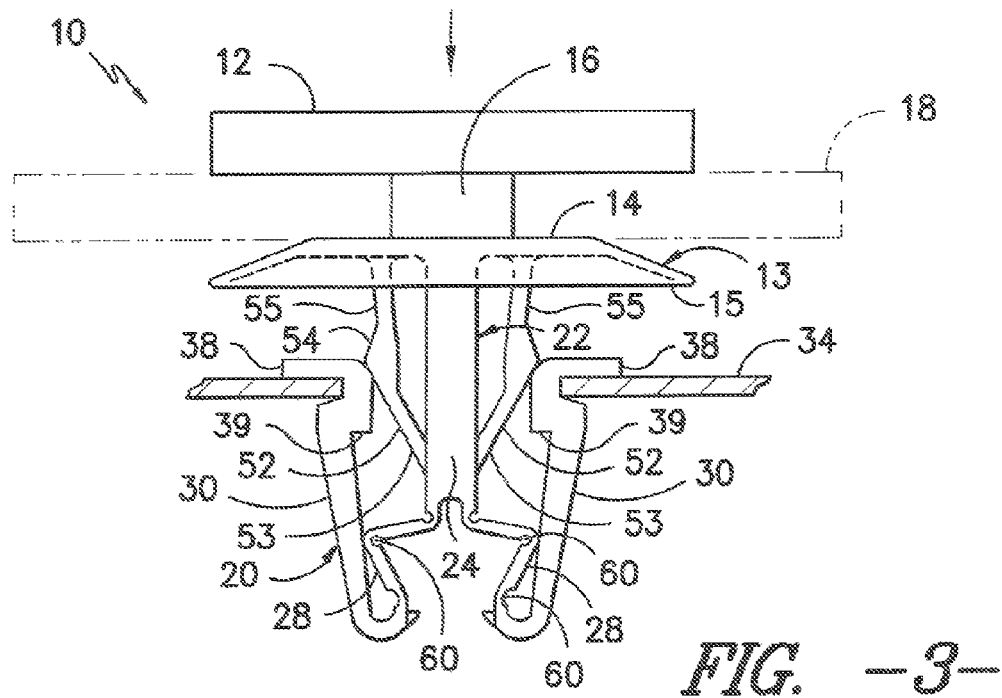
FIG. -3-
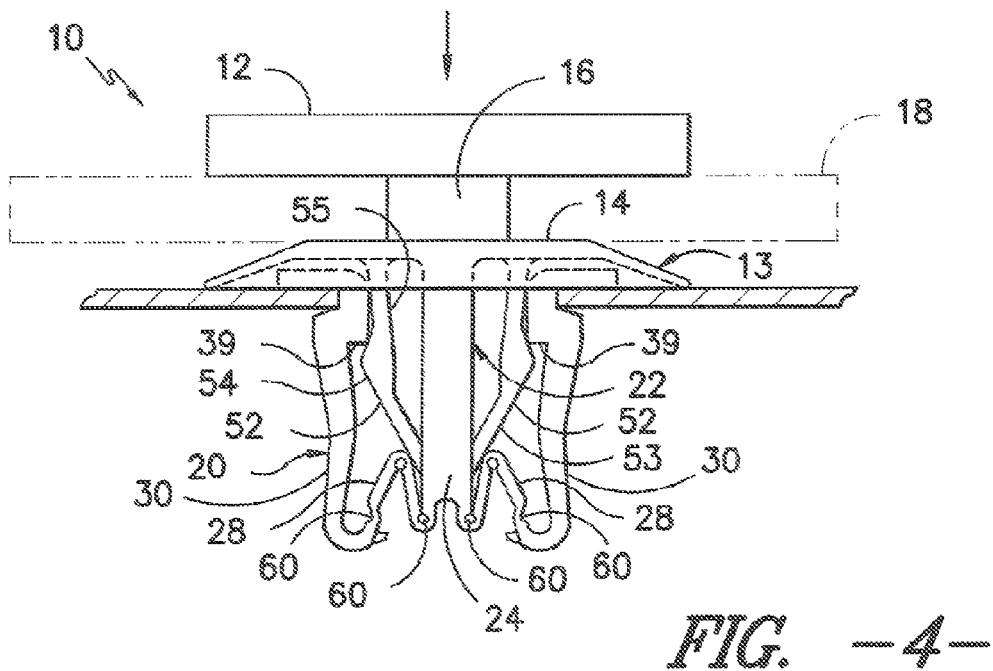
FIG. -4-

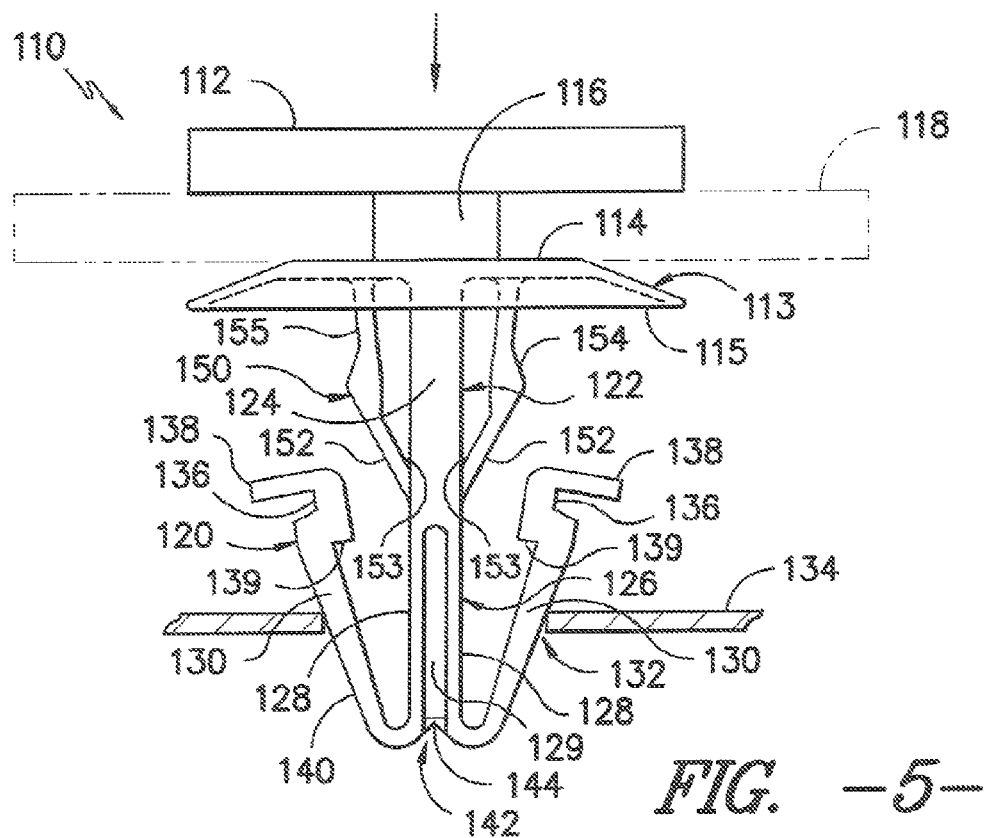
FIG. -5-
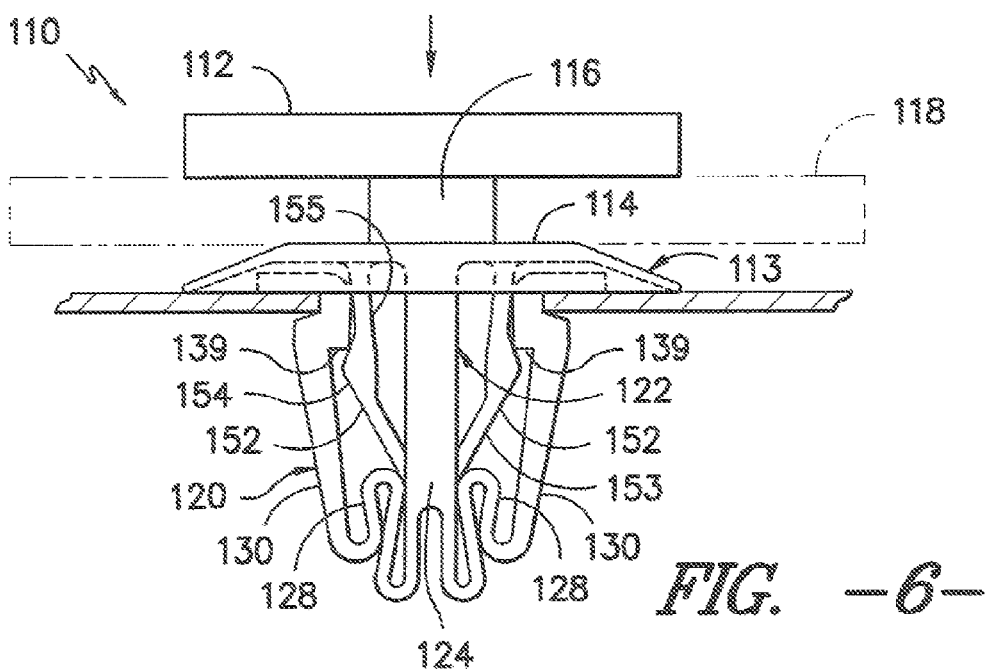
FIG. -6-

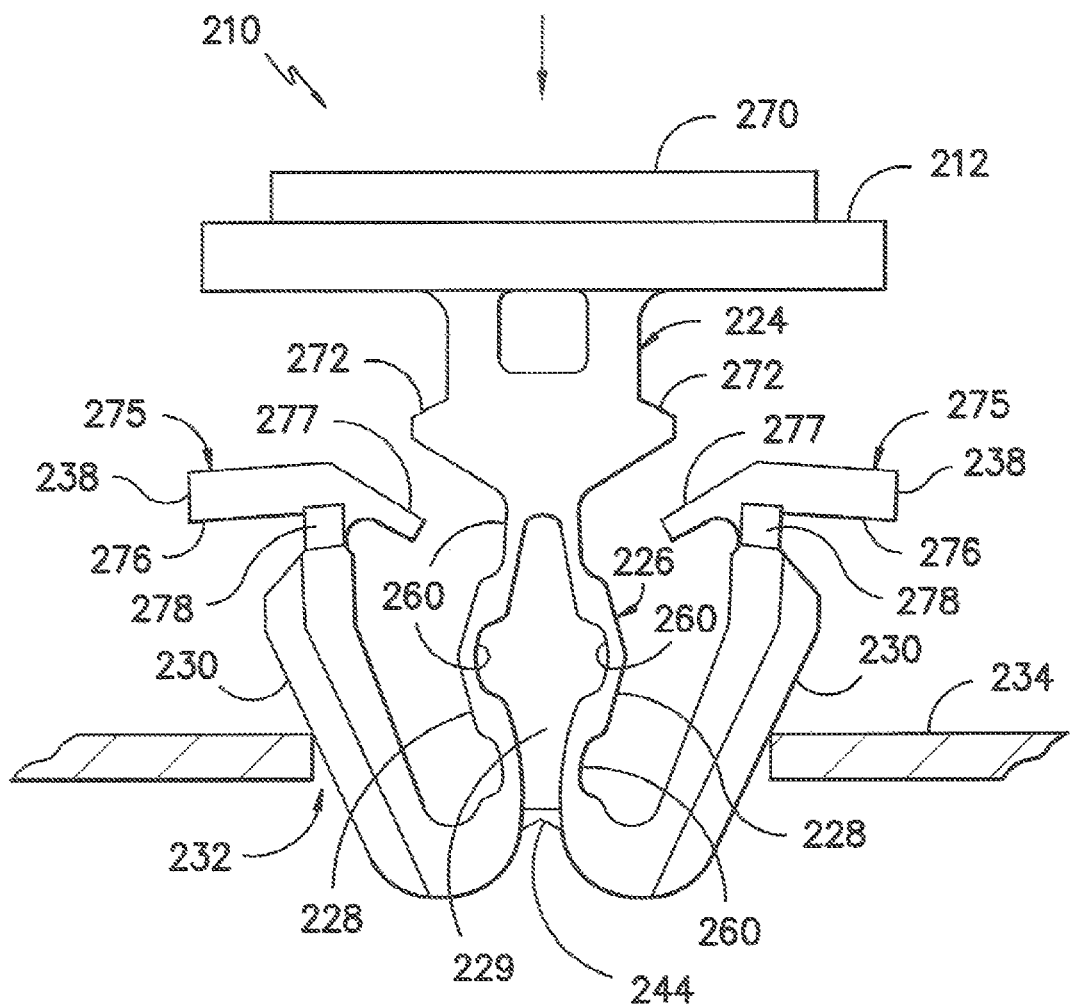
FIG. -7-

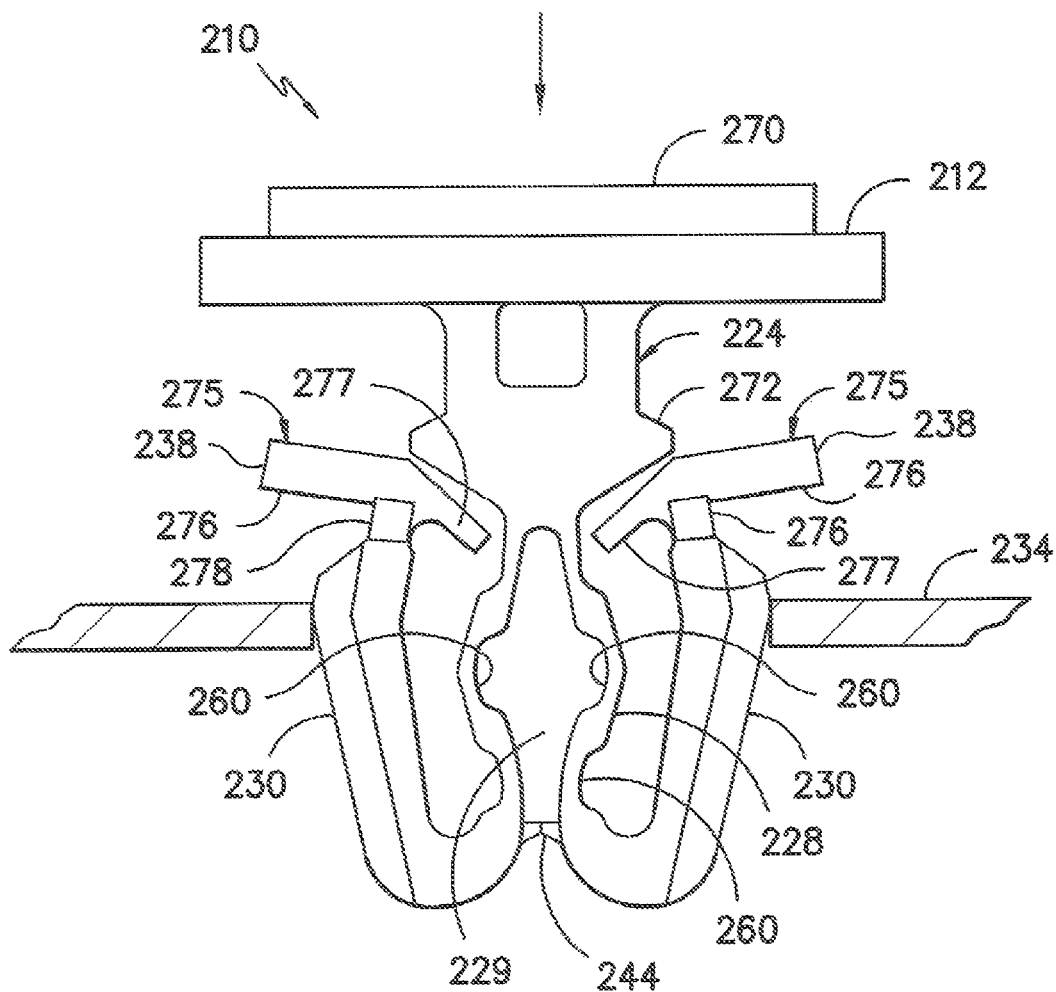
FIG. -8-

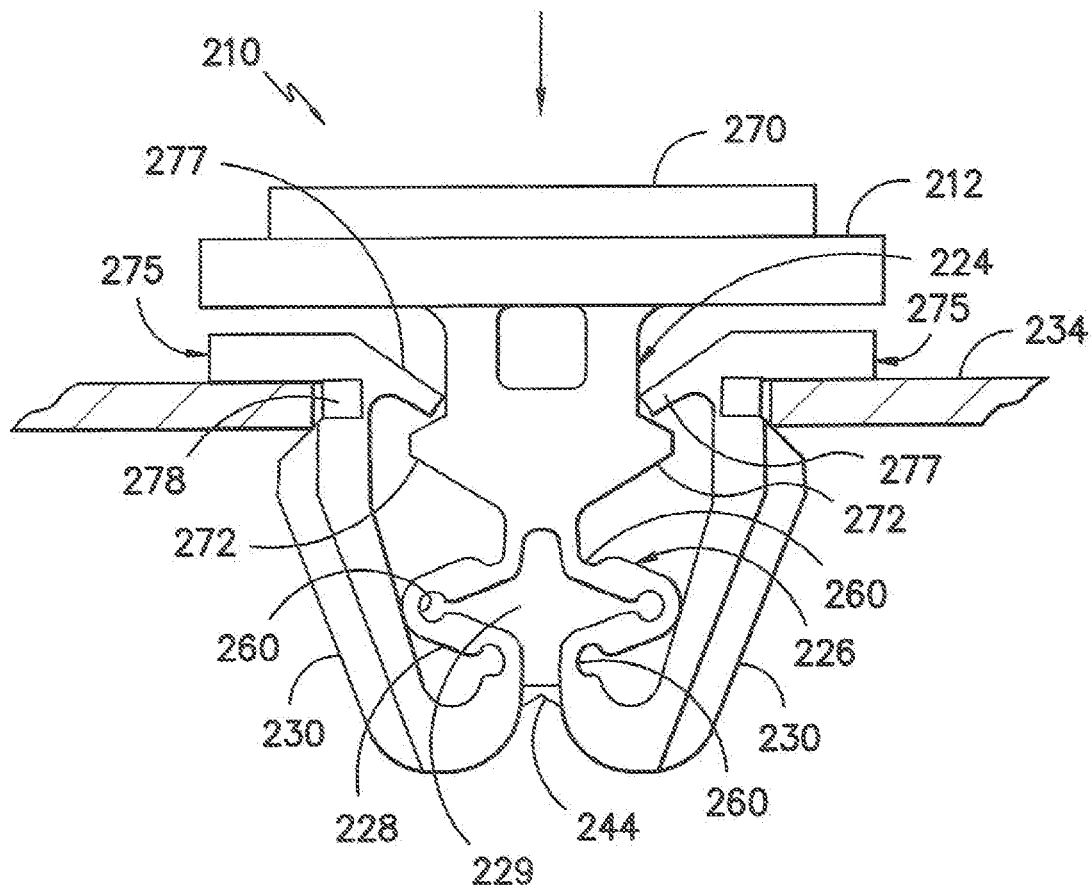
FIG. -9-

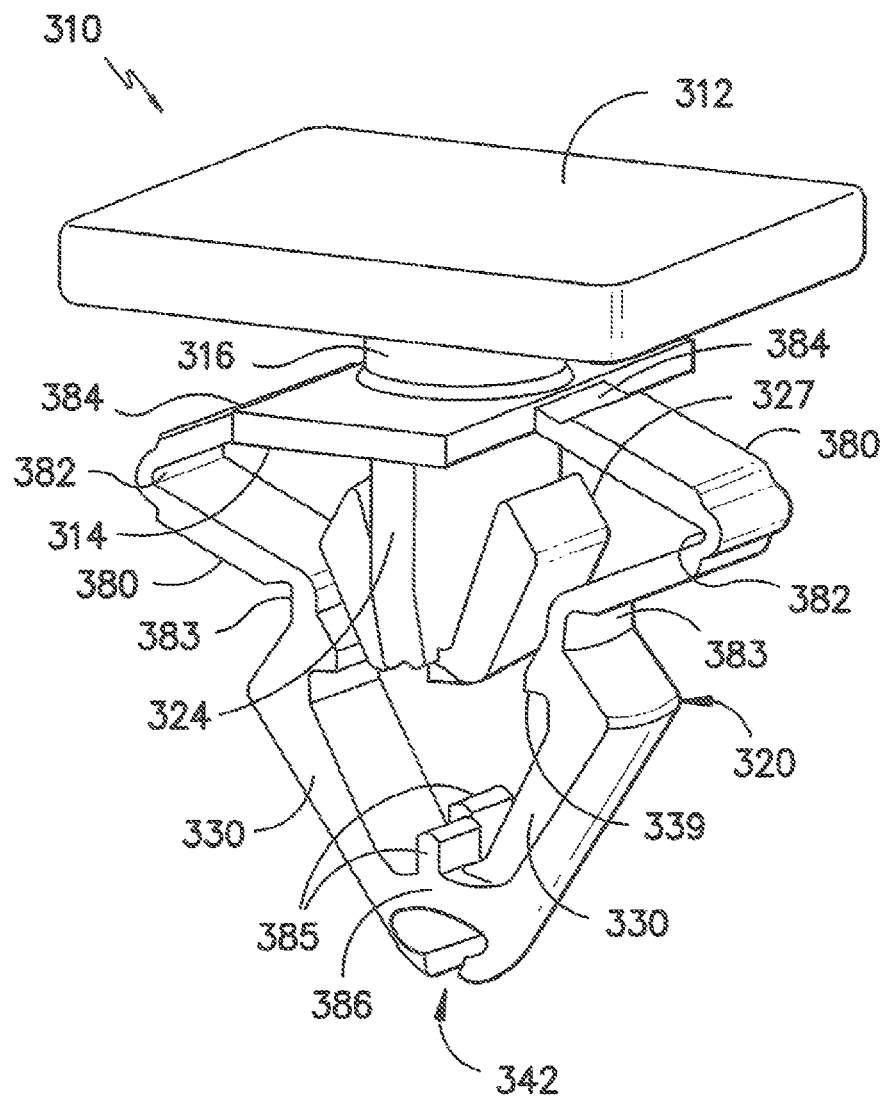
FIG. -10-

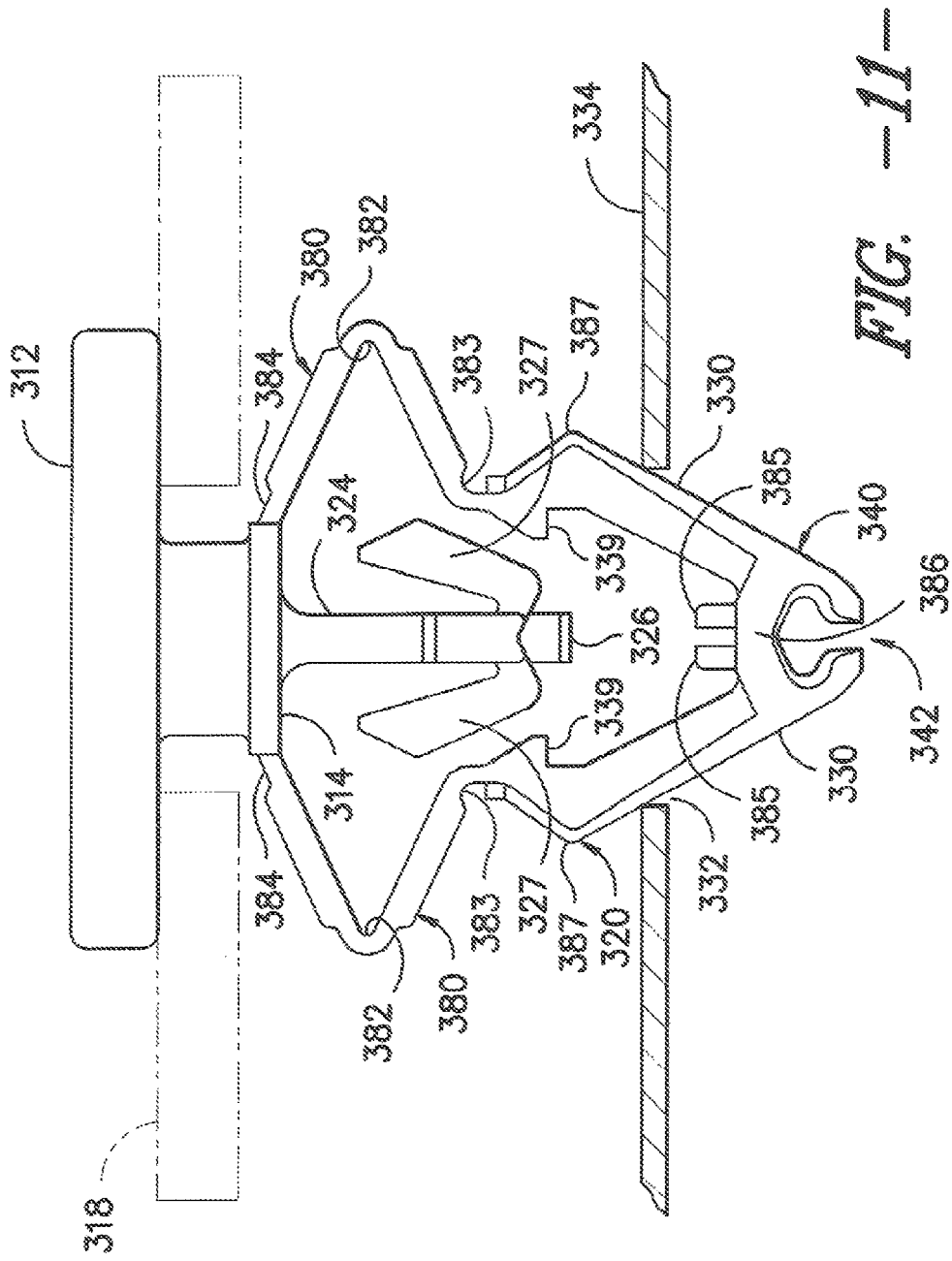
FIG. -11-

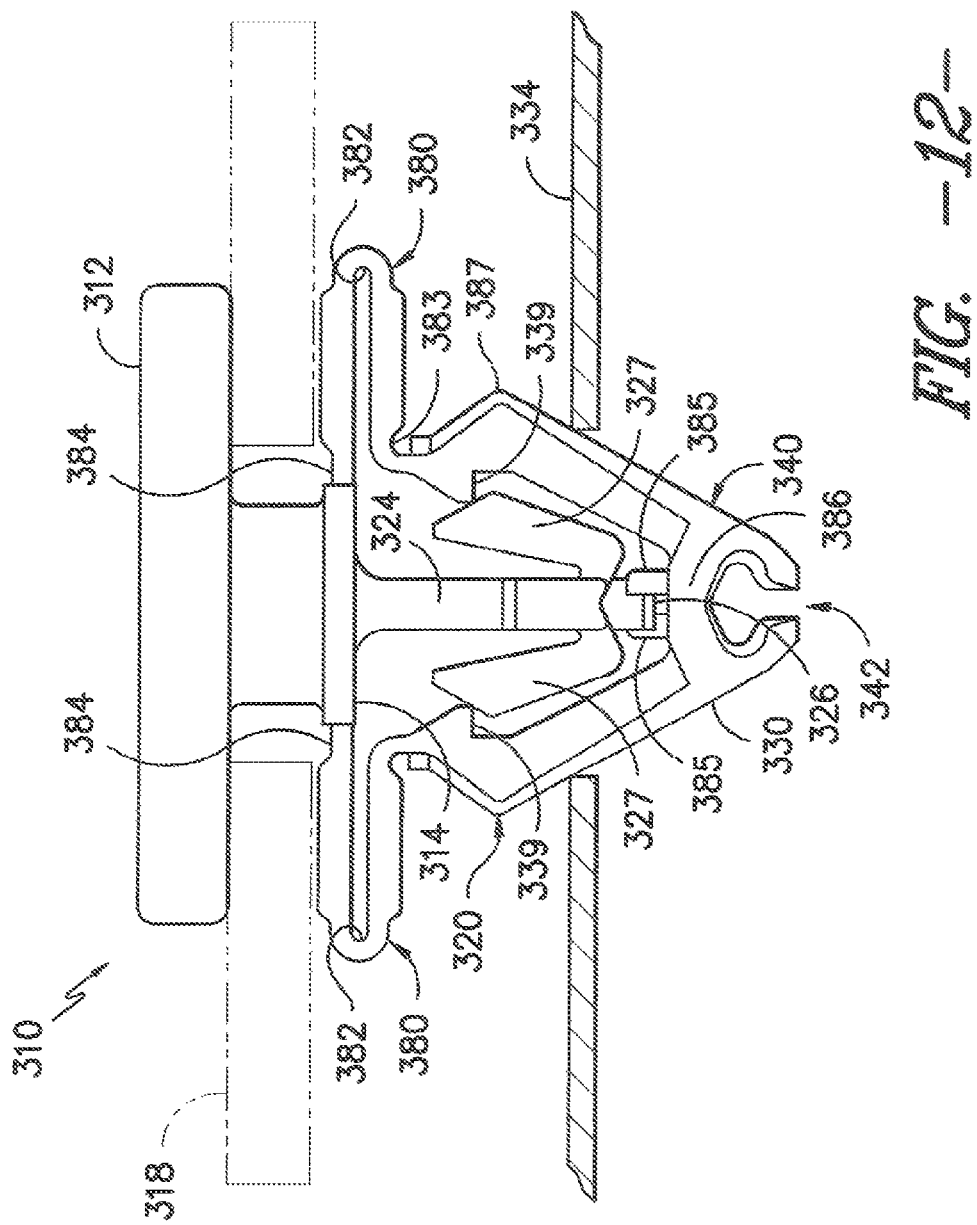
FIG. -12-

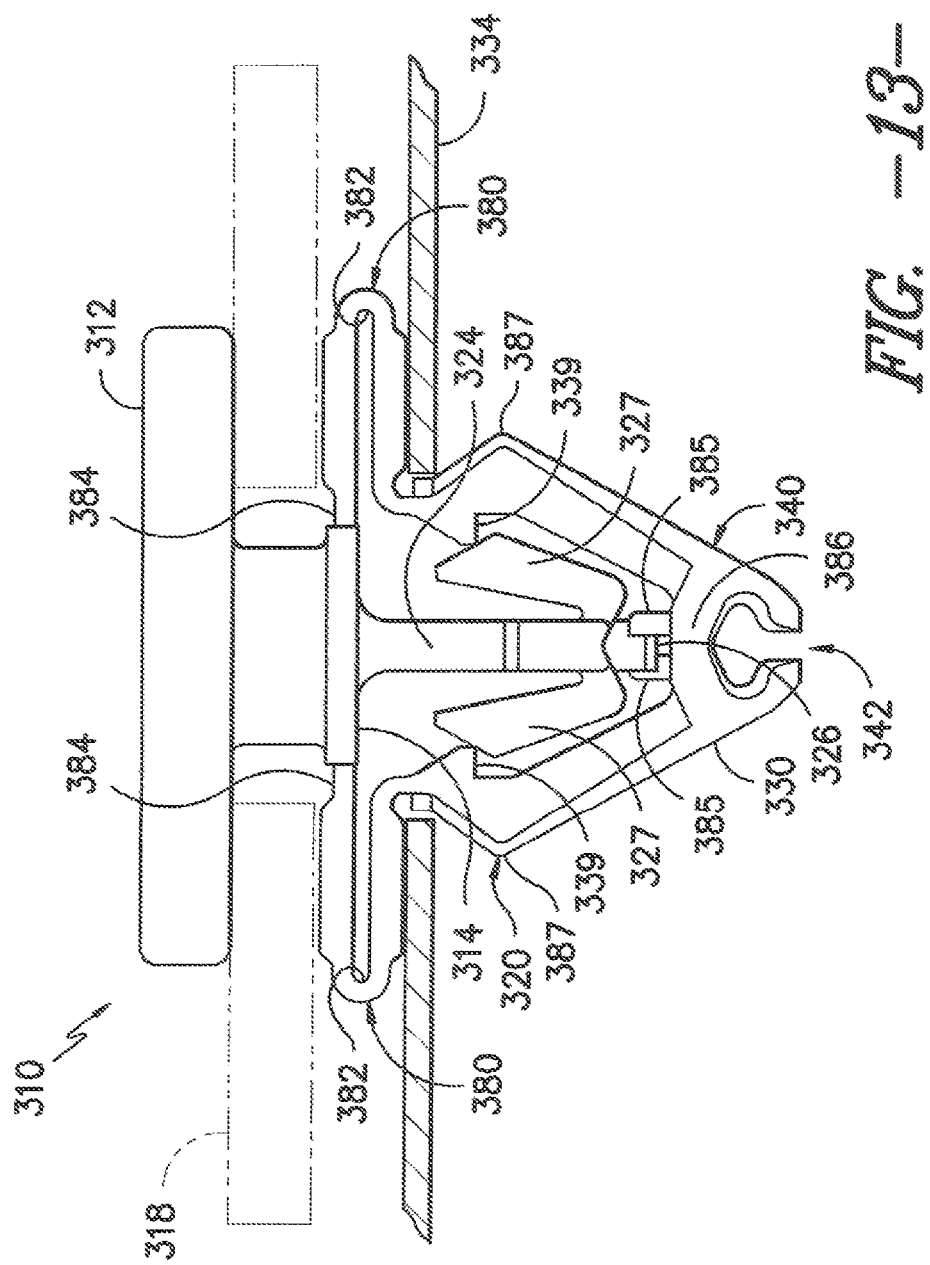
FIG. -13-

COLLAPSIBLE RETAINER

CROSS REFERENCE TO RELATED APPLICATION

This application is a National Phase of International Application Number PCT/US2011/067813, filed Dec. 29, 2011 and claims the benefit of U.S. Provisional Application 61/429,017 filed Dec. 31, 2010.

FIELD OF THE INVENTION

The present invention relates generally to fasteners used as intermediate connectors between a first component and a second component disposed in juxtaposed relation to one another. More particularly, the present invention relates to push-through fasteners including a head portion adapted to operatively engage a first component and a base clip portion extending away from the head portion and adapted to engage a second component such as a panel or other structure.

BACKGROUND OF THE INVENTION

In many assemblies it is necessary to connect one panel or object to another panel or object. For example, in the construction of automobiles, various panels and structures are often connected to other panels or structures or to the automobile frame using press-fit fasteners (also known as "retainers"). It is known that such fasteners may have a head portion and a base clip portion with a generally "W" shape projecting away from the head portion. In using such fasteners, the head of the fastener may be attached to an attachment structure such as a doghouse, return flange or the like on one component with the base clip projecting outwardly for insertion in an opening within the second component to complete the connection.

A number of prior component connection devices and techniques are known and disclosed in the art. These include the connection devices and techniques disclosed in U.S. Pat. Nos. 5,797,714; 5,851,097; 6,715,185; 7,017,239; 7,152,281; 7,698,787 and U.S. Application No. 2007/0166127, all of which are incorporated by reference as if fully set forth herein. While each of these constructions provides various benefits, further improvements may nonetheless be desirable. In particular, improved constructions facilitating so called "blind" insertion while nonetheless providing a low profile, strong connection following insertion may be desirable.

SUMMARY OF THE INVENTION

The present invention provides advantages and alternatives over the prior art by providing an improved fastener with an extended collapsible lead-in to aid in insertion. In this regard, in accordance with one exemplary aspect, the present invention provides a fastener adapted to join a first component to a second component. The fastener includes a proximal head and a distal base clip portion below the head. The base clip portion includes a central post structure and a pair of opposing wings extending in upwardly angled relation away from the axis defined by the post structure. Collapsible legs engage the wings in operative connection to the post structure. As the fastener is pressed inwardly, upon encountering resistance from the second component, the post structure travels axially relative to the wings such that the legs collapse in folded relation.

In accordance with one exemplary feature, the present invention provides a push-through fastener for joining a first component to a second component. The fastener includes a head adapted to engage the first component and a base clip portion disposed below the head and adapted for insertion into an acceptance opening in the second component. The base clip portion includes a pair of flexible wing elements and a post structure of non-collapsible construction projecting along an axial travel path between the wing elements. The post structure is operatively connected to the head such that linear movement of the head is translated to the post structure. The wing elements extending upwardly at acute angles relative to the post structure travel path, at least one collapsible leg operatively connects each of the wing elements to the post structure such that the leg collapses into a folded condition upon application of axial compression as the head is pressed towards the second component and the post structure moves axially between the wing elements following insertion of the base clip portion into the acceptance opening. A method of joining a first component to a second component is also provided. Other advantages and features will become apparent upon review of the following detailed description of potentially preferred embodiments and accompanying drawings.

BRIEF DESCRIPTION OF THE DRAWINGS

FIG. 1 is a schematic side view illustrating an exemplary embodiment of a fastener consistent with the present invention;

FIG. 2 is a schematic view similar to FIG. 1, illustrating initial insertion of the fastener into a panel opening;

FIG. 3 is a view similar to FIGS. 1 and 2 illustrating an intermediate insertion stage of the fastener into a panel opening;

FIG. 4 is a view similar to FIGS. 1-3, illustrating the final stage of insertion of the fastener into a panel opening;

FIG. 5 is a schematic view illustrating another exemplary embodiment of a fastener consistent with the present invention at an initial stage of insertion into a panel opening;

FIG. 6 is a schematic view similar to FIG. 5, illustrating a final stage of insertion into a panel opening;

FIG. 7 is a schematic view illustrating another exemplary embodiment of a fastener consistent with the present invention at an initial stage of insertion into a panel opening;

FIG. 8 is a schematic view similar to FIG. 7, illustrating an intermediate stage of insertion into a panel opening;

FIG. 9 is a view similar to FIGS. 7 and 8, illustrating the final stage of insertion of the fastener into a panel opening;

FIG. 10 is a schematic perspective view illustrating another exemplary embodiment of a fastener consistent with the present invention;

FIG. 11 is a schematic side view illustrating the fastener of FIG. 10 at an initial stage of insertion into a panel opening;

FIG. 12 is a schematic view similar to FIG. 11, illustrating an intermediate stage of insertion into a panel opening; and FIG. 13 is a view similar to FIGS. 11 and 12 illustrating the final stage of insertion of the fastener into a panel opening.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Reference will now be made to the drawings, wherein to the extent possible, like elements are designated by like reference numerals throughout the various views. Referring to FIG. 1, an exemplary fastener 10 is illustrated. By way of example only, any of the embodiments described herein may be formed as a unitary structure from injection molded polymer such as nylon, acetal resin or the like, although other materials my likewise be used. As shown, the fastener 10 includes a table-like head 12 defining a raised platform disposed in opposing relation to a support collar 13 such as an umbrella flange or the like. By way of example only, the support collar 13 may include a relatively rigid upper support platform 14 of disc-like configuration with a continuous or discontinuous pliable skirt 15 disposed radially about the support platform 14. As will be appreciated, while the support platform 14 and the pliable skirt 15 may be formed from a common polymeric material as part of the unitary molded structure, different rigidity levels may be achieved in these and other components by varying the thickness. A neck structure 16 in the form of a reduced diameter post extends between the upper support platform 14 and the underside of the head 12. The head 12 and the support platform 14 may have a generally circular shape, although polymeric shapes such rectangles, hexagons, squares and the like may be used. In any event, the effective outer diameters defined by the head 12 and the support platform 14 are preferably greater than the effective outer diameter defined by the neck structure 16.

In operation, the fastener 10 may be operatively secured to a first component 18 (shown in phantom) such as an intermediate connector in the form of a doghouse connector, return flange or the like by sliding the head 12 into a slot in the intermediate connector in a manner as will be well known to those of skill in the art. The intermediate connector may, in turn, be attached to an overlying panel such as a decorative panel or other structure. Likewise, the head 12 may be connected directly to an overlying component by techniques such as tape, adhesive bonding, mechanical joining or the like.

As illustrated, the fastener 10 further includes base clip portion designated generally as 20 extending away from the underside of the support platform 14. In the exemplary construction, the base clip portion 20 includes a central post structure 22 including a proximal post segment 24 of substantially incompressible solid character projecting away from the support platform 14. The central post structure 22 also includes a distal post segment 26 of split-leg construction including a pair of spaced apart collapsible legs 28 disposed in the axial direction on either side of a longitudinal gap 29. The collapsible legs 28 are adapted for collapse into an accordion folded condition upon the application of compressive force in a manner as will be described further hereinafter.

As illustrated, in the exemplary embodiment, wing elements 30 extend upwardly in angled relation away from the distal ends of the legs 28 such that the complementary legs 28 and the wing elements 30 cooperatively form acute angles. Each of the wing elements 30 is integral with the corresponding leg 28. The wing elements 30 are adapted to flex inwardly to permit passage through an acceptance opening 32 in an attachment panel 34. By way of example only, the attachment panel 34 may be a support panel for vehicle trim or the like. As best seen through joint reference to FIGS. 2 and 3, each of the wings includes an outboard undercut 36 for receipt of the edge of the attachment panel 34 and an overhang defining a shoulder stop 38 which snaps behind an upper surface of the attachment panel 34 upon full insertion (FIG. 3). In the exemplary embodiment, each of the wing elements further includes an inboard ledge 39 extending towards the central post structure 22 at a position below the outboard undercut 36. The inboard ledge 39 defines a catch surface to aid in securing the fastener in place upon full insertion in a manner as will be described further hereinafter.

As illustrated, the lower portions of the wings 30 cooperatively form a relatively long and narrow lead-in nose 40 extending to a distal cusp 42 formed at the intersection of the wings 30. In this regard, the lead-in nose 40 extends outwardly a substantial distance away from the head 12 and support collar 13 such that it may be seen by a user during insertion into an opening in the attachment panel 34. This may facilitate so called "blind attachment" wherein the acceptance opening 32 may be hidden from view during the assembly process. In the exemplary construction, an integral frangible bridge connection 44 extends in joining relation between the wings at the distal cusp 42. The frangible bridge connection 44 thus holds the legs 28 in connected, spaced relation relative to one another during the initial assembly stages shown in FIGS. 1 and 2.

As best seen through joint reference to FIGS. 2 and 3, upon full insertion of the wing elements 30 into the acceptance opening in the attachment panel 34, shoulder stops 38 engage an upper surface of the attachment panel 34 adjacent the acceptance opening 32, thereby blocking further advancement of the attachment panel 34 relative to the wing elements 30 (FIG. 2). Upon the application of further compressive force in the direction shown by the force arrows, the proximal post segment 24 continues to move inwardly in sunken relation between the wing elements 30 (FIG. 3).

As shown, a support frame 50 is disposed outboard of the proximal post segment 24 and generally inboard of the wing elements 30. In the illustrated exemplary embodiment, the support frame 50 is made up of a pair of integral ribs 52 of dog-leg configuration extending between the proximal post segment 24 and the underside of the support collar upper platform 14. As shown, each rib 52 includes a lower segment 53 extending in upwardly angled relation away from the proximal post segment 24 to an enlarged nose 54 projecting radially outboard from the proximal post segment 24. Each rib 52 further includes an upper segment 55 extending between the enlarged nose 54 and the upper platform 14 of the support collar 13.

As will be understood through comparison of FIGS. 2-4, once the shoulder stops 38 engage the attachment panel 34, further inward pressing of the fastener 10 causes inboard surfaces of the wing elements 30 to be pressed against outboard surfaces at the lower segments 53 of ribs 52. As the head 12 and support collar 13 are advanced further by pressing in the direction of the illustrated force arrows, there is relative movement between the central post structure 22 and the wing elements 30 thereby causing the proximal post segment 24 to move into sunken relation between the wing elements 30. During this relative movement, the upwardly angled lower segments 53 act as camming surfaces, causing the free ends of the wing elements 30 to move radially outwardly (FIG. 3) until the inboard ledge 39 engages an inwardly angled upper surface of the nose 54 (FIG. 4). In this condition, the perimeter edges of the acceptance opening are pressed into the outboard undercut 36 and the inboard ledge 39 is supported on the upper surface of the nose 54. In addition, the shoulder stops 38 are covered by the support collar 13.

As will be appreciated, during the camming movement of the free ends of the wing elements 30, the central post structure 22 is placed into compression and a separating force is developed at the distal cusp 42 as the wing elements 30 attempt to rotate to a more vertical orientation to relieve applied stresses. When the separating force at the distal cusp 42 reaches a sufficient level, the molded-in frangible bridge connection 44 ultimately fractures, thereby permitting the wing elements 30 to pivot outwardly (FIG. 3).

In the exemplary construction, each of the legs 28 has an axial compressive strength which is less than the proximal post segment 24 such that the legs 28 collapse into a folded condition preferentially to the proximal post segment 24 upon application of axial compression as the head 12 and support platform 14 are pressed inwardly towards the attachment panel 34 following insertion of the base clip portion 20 into the acceptance opening 32.

By way of example only, in the illustrated exemplary embodiment, the spaced-apart legs 28 forming the distal post segment 26 may incorporate an arrangement of living hinges 60 disposed along their lengths. In operation, the living hinges 60 cause the legs 28 to fold in an accordion manner in response to compression following fracture of the bridge connection 44. By way of example only, the living hinges 60 may be in the form of molded-in indentures disposed at positions along the legs where bending is desired. As will be appreciated, the presence of such an indenture produces a localized reduction in compressive strength such that the leg 28 will tend to fold about the axis of the indenture. In the illustrated embodiment, three indentures are disposed along the length of each leg to provide a tri-fold structure with alternating directional folds. In particular, in the exemplary construction, a first indenture which projects inboard is disposed substantially at the intersection between the leg 28 and the proximal post segment 24. A second indenture which projects outboard is disposed substantially at the midpoint of the leg 28. A third indenture which projects inboard is disposed substantially at the intersection between the leg 28 and the attached wing element 30. Such an arrangement provides the collapsible tri-fold arrangement shown in FIG. 4. Of course, a greater or lesser number of indentures may be used if desired. Regardless of the actual fold structure, once the folds have been made, the folded legs 28 act as spacers to hold the wing elements 30 to the outboard position in wedged relation to the attachment panel 34.

FIGS. 5 and 6 illustrate an alternative construction for a fastener 110 consistent with the present disclosure wherein elements corresponding to those described previously are designated by like reference numerals within a 100 series. In this exemplary construction, the fastener 110 is substantially identical with the embodiment of FIGS. 1-4 but with the difference that the legs 128 are relatively thin, continuous structures along their length without the presence of molded-in living hinges.

As will be understood through comparison of FIGS. 5 and 6, once the shoulder stops 138 engage the attachment panel 134, further inward pressing of the fastener 110 causes inboard surfaces of the wing elements 130 to be pressed against outboard surfaces of the lower segments 153 of ribs 152. As the fastener 110 is advanced further, the lower segments 153 act as camming surfaces, causing the free ends of the wing elements 130 to move radially outwardly until the inboard ledge 139 engages an upper surface of the nose 154 (FIG. 6). In this condition, the perimeter edges of the acceptance opening 132 are pressed into the outboard undercut 136 and the inboard ledge 139 is supported on the upper surface of the nose 154.

As will be appreciated, during the camming movement of the free ends of the wing elements 130, the central post structure 122 is placed into compression and a separating force is developed at the distal cusp 142 as the wing elements 130 attempt to rotate to a more vertical orientation to relieve applied stresses. When the separating force at the distal cusp 142 reaches a sufficient level, the molded-in frangible bridge connection 144 ultimately fractures, thereby permitting the wing elements 130 to pivot outwardly.

In the illustrated exemplary embodiment, the spaced-apart legs 128 forming the distal post segment 126 are sufficiently thin to fold in a generally accordion fashion in response to compression following fracture of the bridge connection 144. In this regard, while the legs 128 are illustrated as folding in a tri-fold serpentine pattern, other accordion folds may occur. Moreover, the folds may be symmetrical or non-symmetrical on each side of the fastener. Regardless of the actual fold structure, once the folds have been made, the folded legs 128 act as spacers to hold the wing elements 130 to the outboard position in wedged relation to the attachment panel 134. Of course, it is also contemplated that combinations of legs with and without living hinges may be used if desired.

FIGS. 7-9 illustrate an alternative construction for a fastener 210 wherein elements corresponding to those described previously are designated by like reference numerals within a 200 series. In this exemplary construction, the head 212 is provided with an attachment tape 270 or other adhesive attachment element for direct connection to an overlying panel or other structure (not shown). A compressively stable proximal post segment 224 projects downwardly away from the underside of the head 212 to a collapsible segment 226 formed by a pair of outwardly bowed foldable legs 228 separate by a longitudinal gap 229. In this embodiment, the proximal post segment 224 includes a pair of radially projecting ears 272 of generally trapezoidal profile.

As illustrated, wing elements 230 extend upwardly in angled relation away from the distal ends of the legs 228 such that the complementary legs 228 and the wing elements 230 cooperatively form acute angles with the wing elements 230 being integral with the connected legs 228. The wing elements 230 are adapted to flex inwardly to permit passage through an acceptance opening 232 in an attachment panel 234 such as a support panel for vehicle trim or the like.

In the exemplary embodiment, a hook structure 275 of dogleg configuration is provided at the free end of each of the wing elements 230. As shown, the hook structures 275 each include an outboard overhang 276 to define a shoulder stop 238 which snaps behind an upper surface of the attachment panel 234 upon full insertion (FIG. 9). In the exemplary embodiment, each of the hook structures 275 further includes an inboard hooking arm 277 angled downwardly and radially inwardly relative to the outboard overhang 276. An integral connection tab 278 of flexible character may extend between the main body of the wing element 230 and the hook structure 275. As best illustrated in FIG. 8, such a connection tab permits limited rotation of the hook structure during insertion.

As will be understood through comparison of FIGS. 8 and 9, as the fastener 210 is advanced, the lower surfaces of the radially projecting ears 272 act as camming surfaces against the inboard hooking arms 277, thereby causing the free ends of the wing elements 230 to move radially outwardly as the inboard hooking arms 277 move over the radially projecting ears 272 until snapping behind the upper surface of the ears (FIG. 9). In this condition, on each side the outboard overhang is held securely against the upper surface of the attachment panel 234 with the inboard hooking arm 277 supported on the upper surface of the corresponding radially projecting ear 272.

As will be appreciated, during the camming movement of the free ends of the wing elements 230, the legs 228 are placed into compression due to the blocking action between the outboard overhang 276 and the attachment panel 234. In the illustrated exemplary embodiment, the spaced-apart legs 228 incorporate an arrangement of living hinges 260 disposed along their lengths. In operation, the living hinges 260 cause the legs 228 to fold in an accordion manner in response to compression without requiring fracture of the bridge connection 244. By way of example only, in the exemplary configuration, the living hinges 260 may be in the form of molded-in curves at positions of slightly reduced material thickness along the legs 228. As will be appreciated, the presence of such a curve promotes localized bending at that location such that the leg 228 will tend to fold about the axis of the curve.

In the illustrated embodiment, the legs 228 have a recurved bow configuration incorporating a major central curve projecting outwardly in combination with upper and lower minor curves projecting inwardly along the length of each leg to provide a tri-fold structure with alternating directional folds. In particular, in the exemplary construction, an upper minor curve projects inboard and is disposed substantially at the intersection between the leg 228 and the proximal post segment 224. A major central curve projects outboard and is disposed substantially at the midpoint of the leg 228. A lower minor curve which is substantially the same as the upper minor curve projects inboard is disposed substantially at the intersection between the leg 228 and the attached wing element 230. Such an arrangement provides the collapsible tri-fold arrangement shown in FIG. 9. A greater or lesser number of curves may be used if desired.

FIGS. 10-13 illustrate an alternative construction for a fastener 310 of unitary molded construction wherein elements corresponding to those described previously are designated by like reference numerals within a 300 series. In this exemplary construction, the head 312 is spaced apart from an underlying support platform 314 extending radially outwardly from a neck structure 316 between the head 312 and the support platform 314. In the illustrated exemplary configuration, the head 312 and the support platform 314 are each substantially rectangular in configuration and are disposed in generally parallel planes. In this embodiment, the length dimensions of the rectangular head 312 and the support platform 314 are oriented in transverse relation at approximately 90 degrees relative to one another. As will be appreciated, such an arrangement provides bi-directional support relative to a first component 318 (shown in phantom FIG. 11) such as an intermediate connector in the form of a doghouse connector, return flange or the like as will be well known to those of skill in the art.

In the illustrated exemplary construction, a compressively stable post segment 324 projects downwardly away from the underside of the support platform 314. As shown, the post segment 324 may have a generally flat or wedge-shaped profile. As best seen in the cross-sectional views of FIGS. 11-13, in the exemplary embodiment a distal tab portion 326 projects downwardly away from the post segment 324 for use in maintaining alignment of the post segment upon compression of the fastener 310 in a manner to be described hereinafter. In the illustrated exemplary construction, flexible arm elements 327 extend in angled relation upwardly away from opposite sides of the post segment 324. As shown, the flexible arm elements 327 intersect the post segment 324 at an elevation such that the distal tab portion 326 projects downwardly away from the intersection location.

As best seen in FIG. 11, the fastener 310 further includes base clip portion 320 disposed below the support platform 314. The base clip portion 320 has a generally angled geometry formed by a pair of flexible wing elements 330 which extend in upwardly angled relation away from a distal cusp 342 at the apex of the base clip portion 320 to define an angled lead-in nose 340. In the condition illustrated in FIG. 11, the lead-in nose 340 may be positioned a significant distance away from the head 312 and support platform 314. This extended distance may facilitate insertion into an acceptance opening 332 in an attachment panel 334 as previously described. In the exemplary embodiment, each of the wing elements 330 includes an inboard ledge 339 extending generally towards the post segment 324. The inboard ledge 339 defines a catch surface to aid in securing the fastener in place upon full insertion in a manner as will be described further hereinafter.

In the embodiment illustrated in FIGS. 10-13, foldable legs 380 extend between the upper ends of each wing element 330 and the opposing lateral sides of the support platform 314 thus forming an operative connection between the wing elements 330 and post segment 324 which projects downwardly from support platform 314. As will be understood, while only a single leg 380 is shown as extending between each wing element 330 and the support platform 314, two or more such foldable legs may likewise be used on each side if desired.

In the illustrated exemplary embodiment, each of the foldable legs 380 has a generally bi-fold construction to permit collapse upon the application of compressive force during the insertion process as will be described further. The foldable legs 380 each include an outwardly projecting living elbow hinge 382 located at an intermediate position between the wing element 330 and the support platform 314. An inwardly projecting living elbow hinge 383 is disposed substantially at the intersection between each of the foldable legs 380 and the corresponding wing elements 330. Thus, the living elbow hinges 382, 383 fold in opposite directions. A living pivot hinge 384 may also be disposed at the intersections between each of the foldable legs 380 and the support platform 314 to facilitate a pivoting action by the foldable arms relative to the support platform during folding. Of course, it is to be understood that the various living hinges may be of any suitable form which facilitates the desired bending action.

As illustrated, in the exemplary configuration the wing elements 330 are connected at their lower ends by a bridge structure 386 overlying the distal cusp 342. A pair of detents 385 may extend upwardly away from the bridge structure so as to project generally towards the support platform 314. As best seen in FIG. 10, the detents 385 may be spaced in offset relation to one another with a separation distance in the depth direction to receive the distal tab portion 326 in relatively tight, wedge-fitting relation with the detents on opposite sides of the distal tab portion 326. In this regard, the distal tab portion 326 may have a slightly angled lower edge to facilitate wedge insertion. Thus, the distal tab portion 326 may be press fit between the detents 385 when the foldable legs 380 are collapsed (FIG. 12) as an aid to maintaining alignment during final insertion between the position of FIG. 12 and the position of FIG. 13.

As illustrated, in the exemplary embodiment the upper ends of the wing elements 330 each have a generally dogleg configuration defining an outwardly projecting nose 387 below the intersection with the corresponding foldable leg 380. This structure provides an indentation above the nose 387 for receipt of the attachment panel 334 upon full insertion (FIG. 13) in a manner as will now be described. Referring now to FIGS. 11-13, according to the illustrated exemplary practice, the lead in nose 340 of the fastener 310 with the attached first component 318 may be inserted into an acceptance opening 332 in an attachment panel 334. Upon engagement between the wing elements 330 and the perimeter of the acceptance opening (FIG. 11), resistance is established such that continued pressing causes the foldable legs 380 to be placed into compression. As the pressing action continues the foldable legs 380 are caused to fold at the living hinges so as to substantially collapse (FIG. 12). As the foldable legs 380 are caused to collapse, the post segment 324 is concurrently moved axially downwardly towards the bridge structure 386 such that the inboard ledges 339 latch over the flexible arm elements 327 and the distal tab portion 326 is captured between the detents 385.

Once the collapsed condition illustrated in FIG. 12 has been achieved, further axial movement of the post segment 324 is prevented and the continued application of pressing force urging the first component 318 towards the attachment panel 334, causes an inward flexing of the wing elements 330 and the flexible arm elements 327 as the base clip portion 320 is forced through the acceptance opening 332. Upon the continued application of pressing force, the insertion of the fastener may continue with the perimeter edges of the acceptance opening eventually passing over the outwardly projecting noses 387 until the surfaces of the attachment panel 334 outboard from the acceptance opening are blocked by the collapsed foldable legs 380 (FIG. 13). In this condition, the perimeter edges of the acceptance opening 332 are pressed into the indentations above the outwardly projecting noses 387. As will be appreciated, once attachment has been established, the outwardly projecting noses 387 aid in blocking withdrawal of the fastener. In addition, a tight, wedged relation is maintained by the outward biasing forces applied from the inwardly flexed wing elements 30. Thus, a secure and low profile connection is established between the first component 318 and attachment panel 334.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

What is claimed is:

1. A press-in fastener for joining a first component to a second component, said fastener comprising:
   a head adapted to engage the first component; and
   a base clip portion disposed below the head and adapted for insertion into an acceptance opening in the second component, the base clip portion including a pair of flexible wing elements and a post structure of substantially incompressible construction disposed along an axial travel path between the wing elements, the wing elements extending upwardly at acute angles relative to the post structure travel path, the post structure being operatively connected to the head such that linear movement of the head is translated to the post structure, at least one collapsible leg operatively connecting each of the wing elements to the post structure such that said at least one collapsible leg collapses into a folded condition upon application of axial compression as the head is pressed towards the second component and the post structure moves axially between the wing elements following insertion of the base clip portion into the acceptance opening.

2. The press-in fastener as recited in claim 1, wherein the fastener is of unitary molded polymer construction.

3. The press-in fastener as recited in claim 1, wherein each of the wing elements includes an outboard projecting shoulder stop adapted to blockingly engage an upper surface of the second component.

4. The press-in fastener as recited in claim 3, wherein each of the wing elements includes an undercut disposed below the shoulder stop adapted to engage a perimeter edge of the acceptance opening.

5. The press-in fastener as recited in claim 1, wherein each of the wing elements includes an inboard ledge or hooking arm adapted to engage an opposing projection extending away from the post structure as the head is pressed towards the second component following insertion of the base clip portion into the acceptance opening.

6. The press-in fastener as recited in claim 1, wherein a pair of ribs of dogleg configuration extends between the post structure and an overlying support platform disposed below the head, at least one of the ribs including an outwardly projecting nose having an outwardly angled lower surface adapted to slidingly engage an inboard surface of an opposing wing element as the head and support platform are pressed towards the second component following insertion of the base clip portion into the acceptance opening.

7. The press-in fastener as recited in claim 6, wherein the outwardly projecting nose includes an inwardly angled upper surface adapted to engage an inboard ledge of an opposing wing element as the head and support platform are pressed towards the second component following insertion of the base clip portion into the acceptance opening.

8. The press-in fastener as recited in claim 1, wherein a hook structure of dogleg configuration including a downwardly angled inboard hooking arm is disposed at a free end of each of the wing elements.

9. The press-in fastener as recited in claim 8, wherein the post structure includes a pair of opposing, outwardly projecting ears, and wherein each of the inboard hooking arms is adapted to latch over an opposing one of the outwardly projecting ears as the head is pressed towards the second component following insertion of the base clip portion into the acceptance opening.

10. The press-in fastener as recited in claim 1, wherein an overlying support platform is disposed below the head in overlying relation to the post structure, and wherein a pair of upwardly angled flexible arm elements extend away from opposing sides of the post structure, and wherein each of the wing elements includes an inboard ledge adapted to engage an opposing one of the flexible arm elements as the head is pressed towards the second component following insertion of the base clip portion into the acceptance opening.

11. The press-in fastener as recited in claim 10, wherein at least one collapsible leg extends between an upper portion of each wing element and the support platform.

12. The press-in fastener as recited in claim 11, wherein at least one collapsible leg includes a plurality of living hinges arranged in alternating in-board and out-board orientation along the collapsible leg such that the collapsible leg collapses upon application of axial compression as the head is pressed towards the second component following insertion of the base clip portion into the acceptance opening.

13. The press-in fastener as recited in claim 12, wherein the wing elements cooperatively form a distal cusp disposed below a molded-in bridge connection between the wing elements, and wherein a pair of spaced-apart detents projects upwardly away from the bridge connection, the post structure including a downwardly projecting distal tab portion sized and shaped for receipt between the detents when the post structure has moved axially between the wing elements following insertion of the base clip portion into the acceptance opening.

14. The press-in fastener as recited in claim 1, wherein each of the collapsible legs includes a plurality of living hinges arranged in alternating in-board and out-board orientation such that the leg collapses into an accordion folded condition upon application of axial compression as the head is pressed towards the second component following insertion of the base clip portion into the acceptance opening.

15. The press-in fastener as recited in claim 1, wherein at least one of the collapsible legs is free of living hinges.

16. A press-in fastener as recited in claim 1, wherein a collapsible leg extends between a lower portion of each wing element and a distal end of the post structure, the legs being separated by a longitudinal gap, each of the legs including a plurality of living hinges disposed along the length, the living hinges being arranged in alternating in-board and out-board orientations along the legs, wherein the legs have an axial compressive strength less than the post structure such that the legs collapse into an accordion folded condition preferentially to the post structure upon application of axial compression as the head is pressed towards the second component following insertion of the base clip portion into the acceptance opening.

17. The press-in fastener as recited in claim 1, wherein the collapsible legs include a first leg section that is articulable relative to a second leg section, wherein collapsation of the legs results in distal locations of the leg sections being located closer to one another than that which was the case prior to collapsation of the legs.

18. The press-in fastener as recited in claim 1, wherein the wings have a free end located at an end of the upwardly extension thereof.

19. A press-in fastener for joining a first component to a second component, said fastener comprising a unitary molded polymer structure including:
a head adapted to engage the first component;
a neck extending downwardly from the head, the neck having an effective diameter less than the head;
a support platform disposed below the neck, the support platform projecting outwardly away from the neck in transverse orientation to the head; and
a base clip portion disposed below the head and adapted for insertion into an acceptance opening in the second component, the base clip portion including a pair of flexible wing elements and a post structure disposed along an axial travel path between the wing elements, the wing elements extending upwardly at acute angles relative to the post structure travel path, the post structure extending downwardly from the support platform in operative connection to the head such that linear movement of the head is translated to the post structure, at least one collapsible leg extending between an upper portion of each wing element and the support platform to operatively connect each of the wing elements to the post structure such that said at least one collapsible leg collapses into a folded condition upon application of axial compression as the head is pressed towards the second component and the post structure moves axially between the wing elements following insertion of the base clip portion into the acceptance opening, wherein a pair of upwardly angled flexible arm elements extend away from opposing sides of the post structure, and wherein each of the wing elements includes an inboard ledge adapted to engage an opposing one of the flexible arm elements as the head is pressed towards the second component following insertion of the base clip portion into the acceptance opening and wherein the wing elements cooperatively form a distal cusp disposed below a molded-in bridge connection between the wing elements with a pair of spaced-apart detents projects upwardly away from the bridge connection, the post structure including a downwardly projecting distal tab portion sized and shaped for receipt between the detents when the post structure has moved axially between the wing elements.

20. A press-in fastener as recited in claim 19, wherein each collapsible leg includes a plurality of living hinges arranged in alternating in-board and out-board orientation along the collapsible leg such that the collapsible leg collapses upon application of axial compression as the head is pressed towards the second component following insertion of the base clip portion into the acceptance opening.

21. A press-in fastener as recited in claim 19, wherein each of the wing elements includes an outwardly projecting nose disposed below an intersection with the corresponding collapsible leg.

22. The press-in fastener as recited in claim 19, wherein the collapsible legs include a first leg section that is articulable relative to a second leg section, wherein collapsation of the legs results in distal locations of the leg sections being located closer to one another than that which was the case prior to collapsation of the legs.

23. The press-in fastener as recited in claim 19, wherein the wings have a free end located at an end of the upwardly extension thereof.

24. A method of joining a first component to a second component, the method comprising the steps of:
providing a press-in fastener, said fastener comprising a head adapted to engage the first component and a base clip portion disposed below the head and adapted for insertion into an acceptance opening in the second component, the base clip portion including a pair of flexible wing elements and a post structure of substantially incompressible construction disposed along an axial travel path between the wing elements, the wing elements extending upwardly at acute angles relative to the post structure travel path, the post structure being operatively connected to the head such that linear movement of the head is translated to the post structure, at least one collapsible leg operatively connecting each of the wing elements to the post structure such that said at least one collapsible leg collapses into a folded condition upon application of axial compression as the head is pressed towards the second component and the post structure moves axially between the wing elements following insertion of the base clip portion into the acceptance opening; and
pressing the base clip portion into an acceptance opening in the second component, such that the collapsible legs collapse into a folded condition preferentially to the post structure upon application of axial compression as the head is pressed towards the second component following insertion of the base clip portion into the acceptance opening.

25. The method of claim 24, wherein the collapsible legs include a first leg section that is articulable relative to a second leg section, wherein collapsation of the legs results in distal locations of the leg sections being located closer to one another than that which was the case prior to collapsation of the legs.

26. The method of claim 24, wherein the wings have a free end located at an end of the upwardly extension thereof.

\* \* \* \* \*